United States Patent Office 3,364,350
Patented Jan. 16, 1968

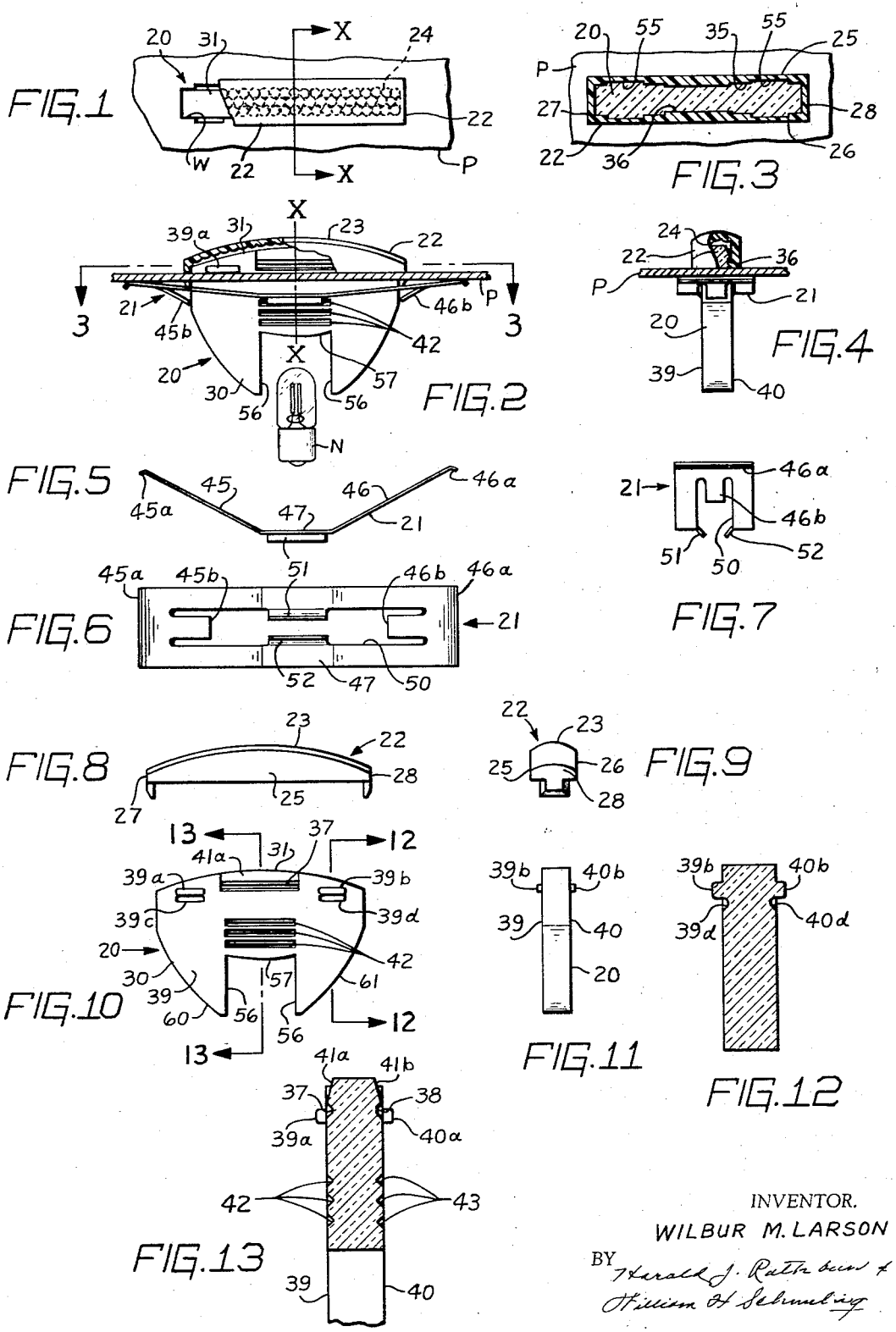

3,364,350
PILOT LIGHT LENS MOUNTING STRUCTURE
Wilbur M. Larson, Brookfield, Wis., assignor to Square
D Company, Park Ridge, Ill., a corporation of Michigan
Filed Oct. 25, 1966, Ser. No. 589,365
10 Claims. (Cl. 240—152)

This invention relates to pilot lights mountable in enclosures or panels for electrical equipment or the like, and more particularly to a cooperating pilot light lens and spring member wherein the spring member is operable to retain the lens in a window-like opening in enclosure or panel walls of various thicknesses.

The invention is an improvement on the mounting means for a pilot or indicating light lens disclosed in U.S. Patent No. 3,228,288 of Kenneth J. Marien which issued Jan. 11, 1966 to the assignee of the present invention. In the Marien patent, a lens of a pilot light is held in an opening in an enclosure wall by interlocking engagement with a resilient transparent lens cap. Shoulders on the lens of the Marien patent bear against the inner surface of the enclosure wall and shoulders on the lens cap bear against the outer surface of the wall thereby to retain the lens in position.

One disadvantage of the lens mounting means of the Marien patent is that a lens and lens cap of different dimensions must be used for each different thickness of enclosure wall encountered in practice. A further disadvantage of the Marien patent is that replacement of the lens cap requires access to the interior of the enclosure. Affording such access is inconvenient and may be unsafe in certain applications.

It is an object of the present invention to provide an improved means for mounting a lens of a pilot light in a window-like opening in a wall of an enclosure or panel for electrical equipment.

A further object is to provide an improved mounting means for a lens of a pilot light which is independent of the lens cap.

Another object is to provide an improved pilot light lens and mounting spring member combination in which the spring member surrounds the lens body and has resilient portions engaging the lens body and further resilient portions engaging an inner surface of an enclosure wall thereby to hold the lens in position in an opening in the wall.

Other objects and advantages of the present invention will become apparent from the following description wherein reference is made to the drawings, in which:

FIG. 1 is a front view of a pilot light lens assembly according to the present invention showing the lens mounted in an opening in an enclosure wall with a portion of a lens cap removed;

FIG. 2 is a top plan view of the assembly of FIG. 1;

FIG. 3 is a cross-sectional view taken generally along the line 3—3 of FIG. 2;

FIG. 4 is a side view of the assembly of FIGS. 1 and 2;

FIG. 5 is a top plan view of a spring mounting member of the assembly of FIG. 1 in its relaxed condition;

FIGS. 6 and 7 are rear and side views, respectively, of the spring member of FIG. 5;

FIGS. 8 and 9 are top and side views, respectively, of the lens cap of the assembly of FIGS. 1 and 2;

FIGS. 10 and 11 are top and side views, respectively, of the lens of the assembly of FIGS. 1 and 2; and FIGS. 12 and 13 are enlarged cross-sectional views of the lens of the assembly of FIGS. 1 and 2 taken generally along the lines 12—12 and 13—13 of FIG. 10.

Referring to FIGS. 1 through 4 of the drawings, a pilot light lens 20 is held by a retaining spring member 21 within a rectangular window-like opening W in a wall of rigid sheet material such as an enclosure wall or panel P. A lens cap 22 is mounted over a front portion of the lens 20 which protrudes forwardly of the panel P.

The lens cap 22 is made of light transmitting material, preferably a suitable translucent or transparent synthetic organic plastic such as clear or tinted polycarbonate, and has a front wall 23 which is convex forwardly about a horizontal axis as viewed in FIG. 1 and curvilinear about a vertical axis disposed rearwardly of the front wall 23. The outer face of the wall 23 is smooth, but the inner face is provided with integral light diffusing protuberances 24. The lens cap 22 has top and bottom walls 25 and 26, respectively, and a pair of end walls 27 and 28.

The lens 20 comprises a body 30 in the form of a flat plate of glass or transparent synthetic organic plastic such as clear acrylic resin. The body 30 is provided with a curvilinear front face 31 which is generally coaxial with the front wall 23 of the lens cap 22 when the lens cap is installed on the lens 20.

The lens cap 22 is secured to the lens 20 by a snap-fastening engagement with the front portion of the lens 20 received a substantial distance within the cap 22. Due to the material of which the cap 22 is made, it is resiliently yieldable. In order to effect the snap-fastening engagement between the cap 22 and the lens 20, the top and bottom walls 25 and 26 of the cap 22 are provided near their inner edges with respective integral longitudinal ribs 35 and 36 (FIG. 3) which are parallel to each other and extend lengthwise of the cap parallel to the rear edges of the walls 25 and 26. The lens 20 is provided with grooves 37 and 38 in its top and bottom faces 39 and 40, respectively, so disposed that when the cap 22 is placed over the forward portion of the lens 20, the ribs 35 and 36 are received in the grooves 37 and 38, respectively. In order to assist in this snap-fastening engagement, the top and bottom faces 39 and 40 of the lens 20 have central cam surfaces 41a and 41b, respectively, which converge toward the forward face 31. Due to the resilience of the walls 25 and 26 of the cap 22, as the cap is placed over the forward face 31 of the lens 20, the ribs 35 and 36 ride up the cam surfaces 41a and 41b and are spread apart and snap into the grooves 37 and 38 when they become aligned therewith.

For mounting the lens 20 in the window-like opening W, the upper lens face 39 has a pair of laterally spaced ribs 39a and 39b and the lower lens face 40 has a pair of laterally spaced ribs 40a and 40b. These ribs are near the front face 31 and have respective rearwardly facing coplanar shoulder portions which butt against the marginal area on the front surface of the panel around the opening W as the lens 20 is inserted into the opening W from the front. The lens faces 39 and 40 have respective groove means comprising groups of spaced parallel grooves 42 and 43, respectively, for lens mounting purposes as will be described. The grooves 42 and 43 are rearward of the shoulder means and are arranged on the lens 20 so as to be parallel with the panel P when the lens is installed.

The spring member 21 is preferably formed of a single elongated strip of spring steel and has a pair of resilient feet 45 and 46 which extend obliquely respectively from opposite ends of a substantially planar central portion 47 toward the front face 31 and preferably diverge away from each other. The feet 45 and 46 have respective short turned-out toe portions 45a and 46a at their outer ends for slidably bearing against the inner surface of the panel P. An elongated opening 50 extends longitudinally centrally of the spring member 21 receiving the lens 20. A pair of resilient fingers 51 and 52 extend obliquely inwardly of the opening 50 from respective central side margins of the opening 50 and converge in a direction away from the front face 31. Also, the pair of feet 45 and 46 have respective fingers 45b and 46b extending inwardly from respective end margins of the opening 50. The fingers 45b and 46b engage respective side faces 60 and 61 of the lens 20 to aid in maintaining the lens 20 in position.

It is desirable that the source of light for the pilot light be a neon lamp, such as indicated at N in FIG. 2. Rays from the lamp N issue generally along the entire length of the lamp. To refract and direct the rays so as to concentrate them on the forward wall of the lens cap 22, the inner portion of the lens 20 is given a special configuration. The lens 20 is preferably formed with the top and bottom faces 39 and 40 planar. The forward face 31 is preferably curvilinear about an upright axis as shown best in FIG. 10. The rear portion of each of the side faces 60 and 61 is convex outwardly edgewise of the lens body and preferably is curvilinear about an upright axis. The convex side faces 60 and 61 thus define respective internally reflecting surfaces that are concave toward the front face 31 of the lens 20.

A rearwardly opening notch, within which the lamp N is positioned, is provided in the body 30 and has spaced forwardly and rearwardly extending side faces 56 which terminate in an inner face 57. The inner face 57 is convex rearwardly and preferably curvilinear about an upright axis. The pairs of faces 56 and 57 and 60 and 61 are preferably symmetrically arranged with respect to a reference plane indicated at X—X in FIGS. 1 and 2, which plane is normal to the planar top and bottom faces 39 and 40 and bisects the forward face 31 and the lamp N.

As a result of this configuration, the rays of light passing from the neon lamp N, no matter where they strike the lens 20, are directed forwardly so that there is an even distribution of light along the entire length of the forward face 31 of the lens 20, and hence along the forward face 23 of the cap 22.

With the same configuration of the lens 20, a conventional incandescent bulb (not shown) also may be used because, though supplying only a point source of light, the source is more intense and the refractions and reflections provide effective distribution of light and substantially parallel rays emerge from the forward face of the lens.

The manner of mounting of the lens 20 in the window-like opening W of the panel P by means of the retaining spring member 21 is shown in FIG. 2. The rear portion of the body 30 is inserted from the front of the panel P through the opening W, as already described, so that the rearwardly facing shoulders of the ribs 39a, 39b, 40a and 40b butt against the marginal portion of the front surface of the panel P immediately around the opening W. The rear portion of the lens 20 is received in the opening 50 of the retaining spring with the feet 45 and 46 extending toward the panel P. As the central portion 47 of the spring member 21 is manually forced toward the panel, the movement of spring member 21 is guided as the fingers 45b and 46b engage faces 60 and 61 to center the spring member 21 on the lens 20 while the spring member 21 is flexed and changes shape from its relaxed position of FIG. 5 to an installed position generally like that of FIG. 2, with the feet 45 and 46 being spread wider apart as the toe portions 45a and 46a slide outwardly along the inner surface of the panel P.

As the spring member 21 is thus flexed, the fingers 51 and 52 are caused alternately to flex outwardly and to return approximately to their relaxed position of FIG. 5 as they engage successive ones of the grooves 42 and 43, respectively, and then remain in an appropriate pair of grooves depending on the thickness of the panel. As shown in FIG. 2, the fingers 51 and 52 engage the respective grooves 42 and 43 positioned to accommodate the thinnest panel material. Engagement of the fingers 51 and 52 in the appropriate ones of the respective grooves 42 and 43 retains the lens 20 in position by forcing the lens 20 rearwardly of the panel P against the bias of the leg portions 45 and 46 with the rearwardly facing shoulders of the ribs 39a, 39b, 40a, and 40b thus held tightly against the front surface of the panel P. Additionally, the fingers 45b and 46b are flexed rearwardly of the panel P by the side walls 60 and 61 of the lens 20 and aid in positioning the lens 20 in the opening W by urging the lens centrally of the opening 50 of the spring 21.

The cap 22, which may be installed either prior or after the lens 20 is inserted in the opening 20, has a group of recesses 55 shown in FIG. 3 for clearing the ribs 39a, 39b, 40a, and 40b of the lens when the cap is snapped into place. As shown in FIGS. 10 and 12, the ribs 39a and 39b have respective recessed stress relieving rounds 39c and 39d. The ribs 40a and 40b have like stress-relieving rounds, respectively, the round associated with the rib 40b being indicated at 40d in FIGURE 12.

I claim:

1. The combination of a pilot light lens and a spring member for mounting the lens in a window-like opening in a wall of rigid sheet material, said combination comprising a lens having a solid light transmitting body provided with a front face and with generally planar top and bottom faces, rearwardly facing shoulder means extending outwardly respectively from said top and bottom faces near, and at substantially the same distance from, said front face, groove means in said top and bottom faces, respectively, positioned rearwardly of said shoulder means, a spring member provided with an opening complementary to said lens body and receiving said lens body so that the spring member is disposed thereabout rearwardly of said shoulder means, said spring member having a pair of resilient feet portions extending obliquely respectively from opposite ends thereof toward said front face of the body and a pair of resilient finger portions extending from a central portion thereof on opposite sides of the central opening and resiliently engaging the top and bottom faces of the body, respectively, the outer end portions of the feet portions of the spring member being positioned to resiliently bear against an inner surface of the wall when the body of the lens is received in the opening in the wall with the shoulder means in engagement with the outer surface of the wall, and the finger portions being received respectively in the groove means of the top and bottom faces.

2. The combination in accordance with claim 1 characterized in that said feet portions are mutually divergent.

3. The combination in accordance with claim 1 characterized in that the respective outer end portions of said feet portions are bent to define smooth surfaces engaging said wall.

4. The combination in accordance with claim 1 characterized in that said finger portions are convergent in a direction away from said central portion.

5. The combination in accordance with claim 1 characterized in that each of said groove means comprises a plurality of grooves spaced apart in a direction from front to rear of said lens body.

6. The combination in accordance with claim 1 characterized in that a pair of resilient finger portions extend inwardly from the respectively end margins of the opening in the spring member and engage respective side faces of the lens.

7. The combination in accordance with claim 1 characterized in that a lens cap is provided and said lens body has, forwardly of said shoulder means, snap-fastening engaging means cooperating with complementary fastening means on said lens cap to removably hold said lens cap over the front portion of said lens body.

8. The combination in accordance with claim 7 characterized in that the top and bottom faces of the lens body converge at the front face to facilitate mutual engagement of said fastening means.

9. The combination in accordance with claim 1 characterized in that said lens body has a rear face, a notch in said lens body opens into said rear face, and a lamp is positioned in said notch.

10. In combination with an enclosure wall of rigid sheet material, a pilot light lens having a solid light transmitting body provided with a front face and with generally planar top and bottom faces, rearwardly facing shoulder means extending outwardly respectively from said top and bottom faces near, and at substantially the same distance from, said front face, groove means in said top and bottom faces, respectively, positioned rearwardly of the shoulder means, a spring member provided with an opening complementary to said lens body and receiving said lens body so that said spring member is disposed thereabout rearwardly of said shoulder means, said spring member having a pair of resilient feet portions extending obliquely respectively from opposite ends thereof toward said front face of the body and a pair of resilient finger portions extending from a central portion thereof on opposite sides of the central opening and engaging the top and bottom faces of the body, respectively, said lens being received in the opening in the wall with the shoulder means in engagement with an outer surface of the wall and the outer end portions of the feet portions of the spring member bearing against an interior surface of the wall, and the finger portions being received respectively in the groove means of the top and bottom faces.

References Cited
UNITED STATES PATENTS

| | | | |
|---|---|---|---|
| 2,778,930 | 1/1957 | Harrington et al. | 240—152 X |
| 2,786,196 | 3/1957 | Haynes et al. | 340—381 |
| 2,826,680 | 3/1958 | Cline | 240—8.16 |
| 3,228,288 | 1/1966 | Marien | 240—152 X |

JOHN M. HORAN, *Primary Examiner.*

NORTON ANSHER, *Examiner.*

WAYNE A. SIVERTSON, *Assistant Examiner.*